(12) United States Patent
Chen

(10) Patent No.: US 12,161,932 B2
(45) Date of Patent: Dec. 10, 2024

(54) COMBINATION RAMP SYSTEM FOR SPORTS

(71) Applicant: Wang-Chuan Chen, Taichung (TW)

(72) Inventor: Wang-Chuan Chen, Taichung (TW)

( * ) Notice: Subject to any disclaimer, the term of this patent is extended or adjusted under 35 U.S.C. 154(b) by 385 days.

(21) Appl. No.: 17/748,210

(22) Filed: May 19, 2022

(65) Prior Publication Data

US 2023/0347232 A1 Nov. 2, 2023

(30) Foreign Application Priority Data

Apr. 28, 2022 (CN) .......................... 202221037231.6

(51) Int. Cl.
*A63C 19/02* (2006.01)
(52) U.S. Cl.
CPC .................................... *A63C 19/02* (2013.01)
(58) Field of Classification Search
CPC ..... A63C 19/00; A63C 19/02; A63C 2201/02; A63C 2203/10
USPC ..................................................... 472/88–91
See application file for complete search history.

(56) References Cited

U.S. PATENT DOCUMENTS

| 9,675,869 | B1 * | 6/2017 | Chin | A63C 19/10 |
| 10,166,459 | B1 * | 1/2019 | Chen | E01D 15/133 |
| 11,117,044 | B1 * | 9/2021 | Chen | A63C 19/10 |
| 11,504,601 | B1 * | 11/2022 | Chen | A63C 19/10 |

FOREIGN PATENT DOCUMENTS

CN 208405991 U 1/2019

\* cited by examiner

*Primary Examiner* — Kien T Nguyen
(74) *Attorney, Agent, or Firm* — Muncy, Geissler, Olds & Lowe, P.C.

(57) ABSTRACT

A combination ramp system includes a first ramp, a second ramp, and a first connection assembly. The first ramp has a first inclined surface. The second ramp has a second inclined surface. The first connection assembly includes a first connecting member and a second connecting member. The first connecting member is provided with a first connecting portion and a first butting portion. The second connecting member is provided with a second connecting portion and a second butting portion connected to the first butting portion. The first connecting member has a first top surface adjacent to the first inclined surface. The second connecting member in the vertical direction has a second top surface adjacent to the second inclined surface.

10 Claims, 8 Drawing Sheets

COMBINATION RAMP SYSTEM FOR SPORTS

BACKGROUND OF THE INVENTION

The present invention relates to a ramp system and, more particularly, to a combination ramp system for sports.

China Patent Application No. 201821106343.6 discloses a sport equipment overlap joint bridge and combination with ramps thereof including a top face and a bottom face. The top face is provided with a first end and a second end opposite to the first end. The bottom face is projectingly provided with a first positioning column and a second positioning column. The first positioning column is adjacent to the first end, and the second positioning column is adjacent to the second end. One end of the first positioning column opposite to the top face is projectingly provided with a first threaded column. One end of the second positioning column opposite to the top face is projectingly provided with a second threaded column. The first threaded column is threaded connected with a first fastening member and sleeved with a first anti-loose member disposed at a side of the first fastening member opposite to the top face. The second threaded column is threaded connected with a second fastening member and sleeved with a second anti-loose member disposed at a side of the second fastening member opposite to the top face.

However, when the above overlap joint bridge is mounted to the ramps, the joint bridge is limited by the combination structure to only connect between the two ramp peaks of the two ramps, resulting in the ramp combination can only provide single terrain type, and can not further connect other ramps, so that the terrain presented by the above overlap joint bridge and ramps lacks variety.

BRIEF SUMMARY OF THE INVENTION

An objective of the present invention is to provide a combination ramp system including a first ramp, a second ramp, and a first connection assembly. The first ramp has a first inclined surface disposed on an upper edge thereof in a vertical direction. The second ramp has a second inclined surface disposed on an upper edge thereof in the vertical direction. A height of the first inclined surface in the vertical direction gradually increases from a position adjacent to the second ramp to a position away from the second ramp, and a height of the second inclined surface in the vertical direction gradually increases from a position adjacent to the first ramp to a position away from the first ramp. The first connection assembly is mounted between the first ramp and the second ramp and includes a first connecting member and a second connecting member. One end of the first connecting member is provided with a first connecting portion connected to the first inclined surface, and another end of the first connecting member is provided with a first butting portion. One end of the second connecting member is provided with a second connecting portion connected to the second inclined surface, and another end of the second connecting member is provided with a second butting portion connected to the first butting portion. An upper edge of the first connecting member in the vertical direction has a first top surface adjacent to the first inclined surface, and an upper edge of the second connecting member in the vertical direction has a second top surface adjacent to the second inclined surface.

In an example, the first butting portion is provided with a first butting flange. The second butting portion is provided with a second butting flange adjacent to the first butting flange. The first connection assembly further includes a first pin extended in a horizontal direction and inserting through the first butting flange and the second butting flange.

In an example, the first inclined surface is provided with a plurality of first insertion holes. The first connecting portion is disposed at a lower edge of the first connecting member in the vertical direction and forms a plurality of first fastening flanges inserting into the plurality of first insertion holes. The second inclined surface is provided with a plurality of second insertion holes. The second connecting portion is disposed at a lower edge of the second connecting member in the vertical direction and forms a plurality of second fastening flanges inserting into the plurality of second insertion holes.

In an example, the first butting portion is further provided with a third butting flange disposed adjacent to one side of the second butting flange opposite to the first butting flange. The second butting portion is further provided with a fourth butting flange disposed adjacent to one side of the third butting flange opposite to the second butting flange. The first connection assembly further includes a second pin extended in the horizontal direction and inserting through the third butting flange and the fourth butting flange.

In an example, the first connection assembly further includes a plurality of first fasteners and a plurality of second fasteners. The plurality of first fasteners are threadedly connected to the plurality of first fastening flanges and abut against a lower edge of the first ramp in the vertical direction. The plurality of second fasteners are threadedly connected to the plurality of second fastening flanges and abut against a lower edge of the second ramp in the vertical direction.

In an example, the upper edge of the second ramp in the vertical direction is provided with an overlap joint portion disposed at one end of the second inclined surface opposite to the first ramp. The combination ramp system further includes a third ramp and a second connection assembly. The third ramp is disposed at one side of the second ramp opposite to the first ramp. The third ramp has a third inclined surface disposed on an upper edge thereof in the vertical direction. A height of the third inclined surface in the vertical direction gradually increases from a position adjacent to the second ramp to a position away from the second ramp. The second connection assembly mounted between the second ramp and the third ramp and including a third connecting member and the fourth connecting member. One end of the third connecting member is provided with a third connecting portion connected to the overlap joint portion, and another end of the third connecting member is provided with a third butting portion. One end of the fourth connecting member is provided with a fourth connecting portion connected to the third inclined surface, and another end of the fourth connecting member is provided with a fourth butting portion connected to third butting portion. An upper edge of the third connecting member in the vertical direction has a third top surface adjacent to the second inclined surface. An upper edge of the fourth connecting member in the vertical direction has a fourth top surface adjacent to the third inclined surface.

In an example, the third butting portion is provided with a fifth butting flange. The fourth butting portion is provided with a sixth butting flange adjacent to the fifth butting flange. The second connection assembly further includes a third pin extended in the horizontal direction and inserting through the fifth butting flange and the sixth butting flange.

In an example, the overlap joint portion is provided with a plurality of third insertion holes. The third connecting portion is disposed at a lower edge of the third connecting member in the vertical direction and forms a plurality of third fastening flanges inserting into the plurality of third insertion holes. The third inclined surface is provided with a plurality of fourth insertion holes. The fourth connecting portion is disposed at a lower edge of the fourth connecting member in the vertical direction and forms a plurality of fourth fastening flanges inserting into the plurality of fourth insertion holes.

In an example, the third butting portion is further provided with a seventh butting flange disposed adjacent to one side of the sixth butting flange opposite to the fifth butting flange. The fourth butting portion is further provided with a eighth butting flange disposed adjacent to one side of the seventh butting flange opposite to the sixth butting flange. The second connection assembly further includes a fourth pin extended in the horizontal direction and inserting through the seventh butting flange and the eighth butting flange.

In an example, the second connection assembly further includes a plurality of third fasteners and a plurality of fourth fasteners. The plurality of third fasteners are threadedly connected to the plurality of third fastening flanges and abut against the lower edge of the second ramp in the vertical direction. The plurality of fourth fasteners are threadedly connected to the plurality of fourth fastening flanges and abut against the lower edge of the third ramp in the vertical direction.

The present invention will become clearer in light of the following detailed description of illustrative embodiments of this invention described in connection with the drawings.

DETAILED DESCRIPTION OF THE INVENTION

Figure 1:
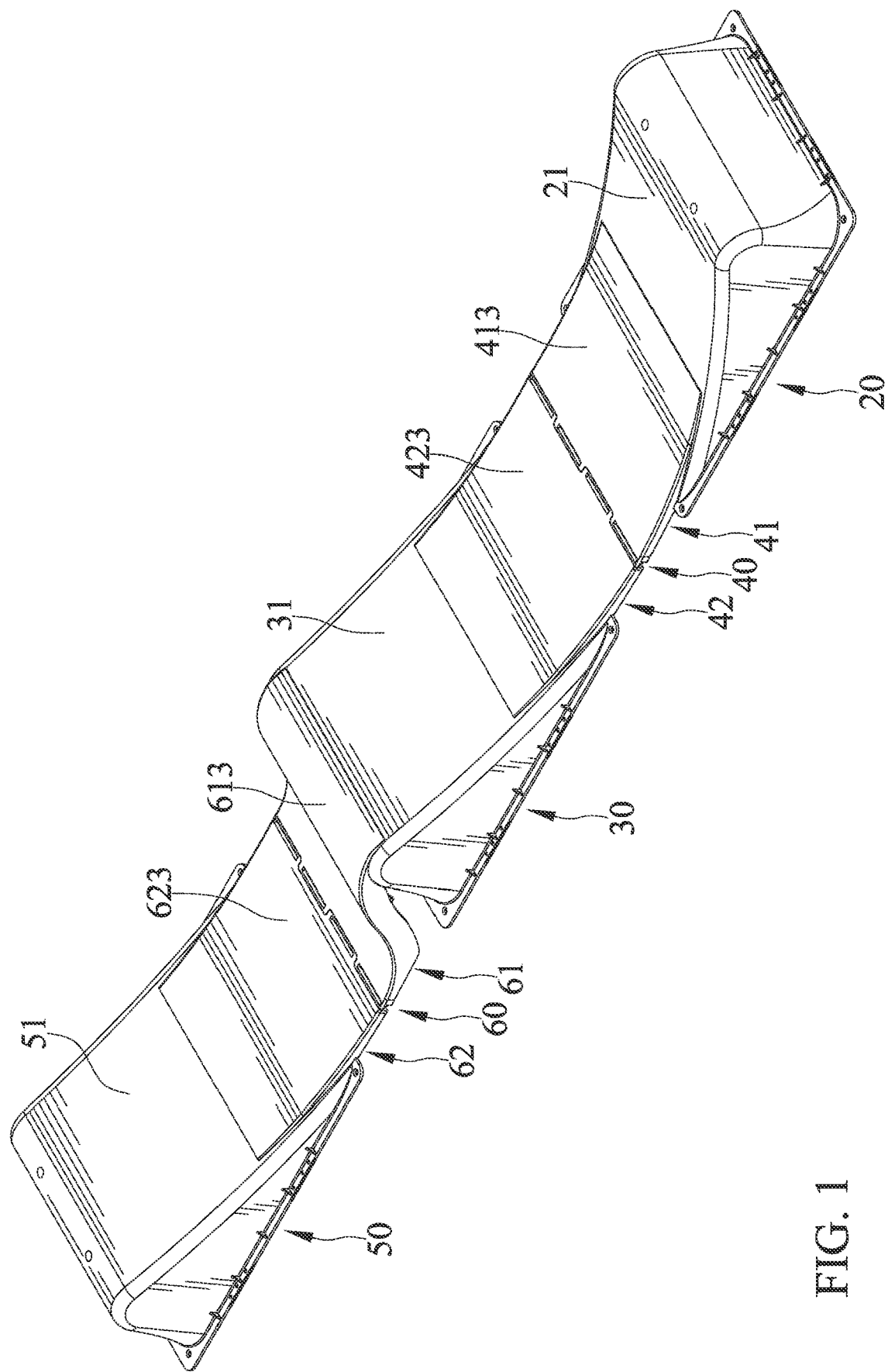
FIG. 1 is a perspective view of a combination ramp system for sports of an embodiment according to the present invention.
Figure 2:
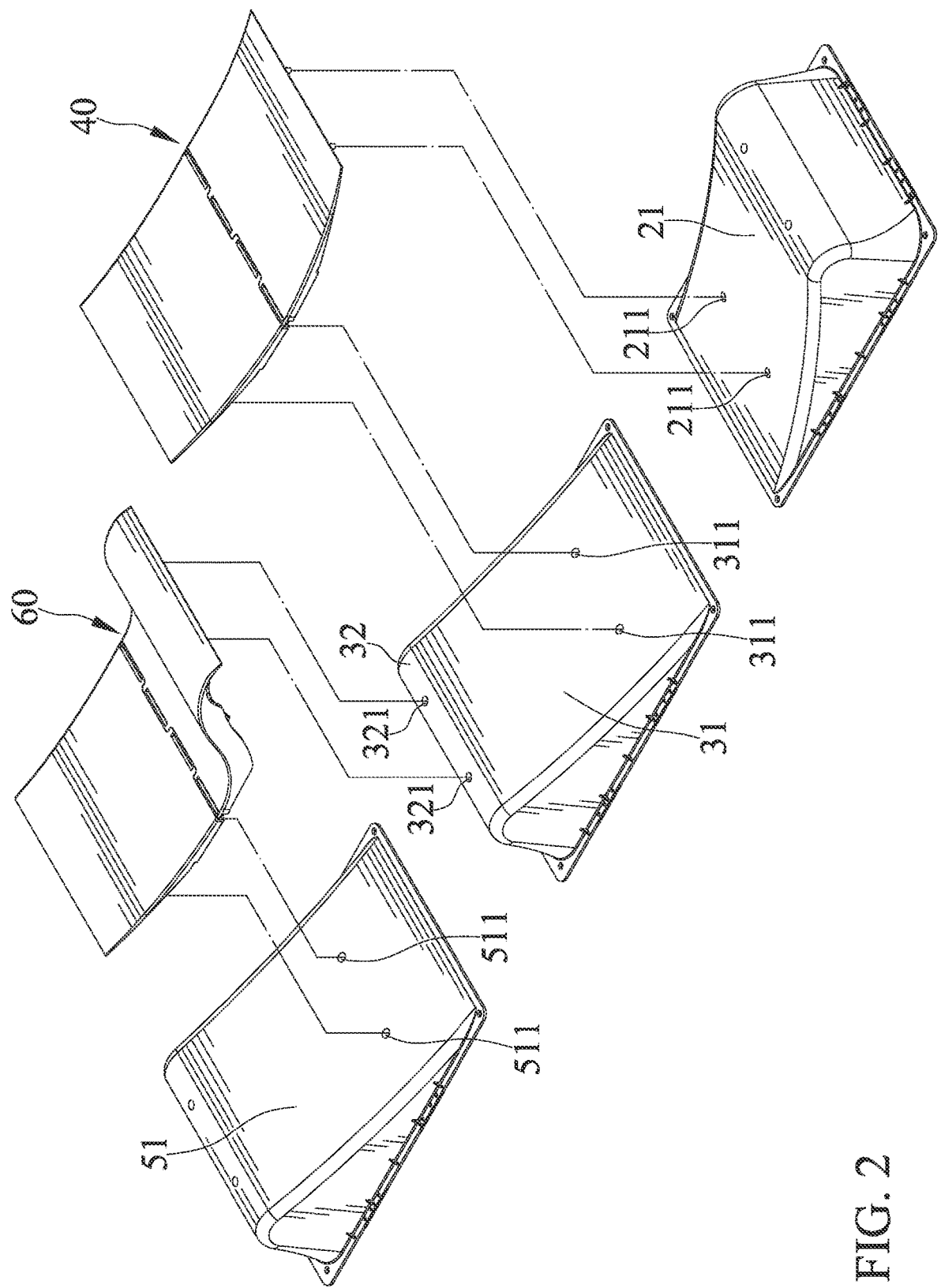
FIG. 2 is an exploded, perspective view of the combination ramp system of FIG. 1.
Figure 3:
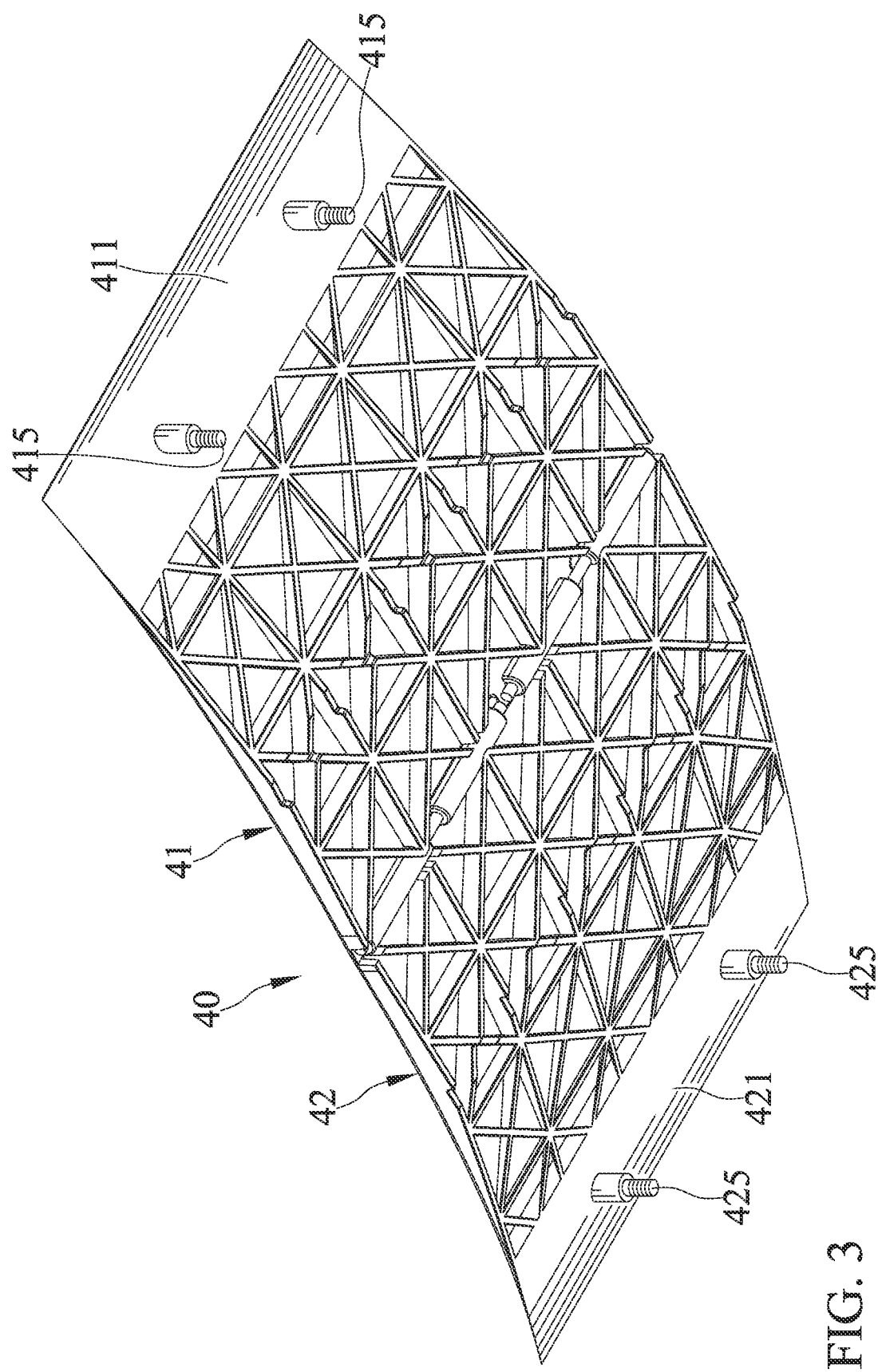
FIG. 3 is a perspective view of a first connection assembly of the combination ramp system of FIG. 1.
Figure 4:
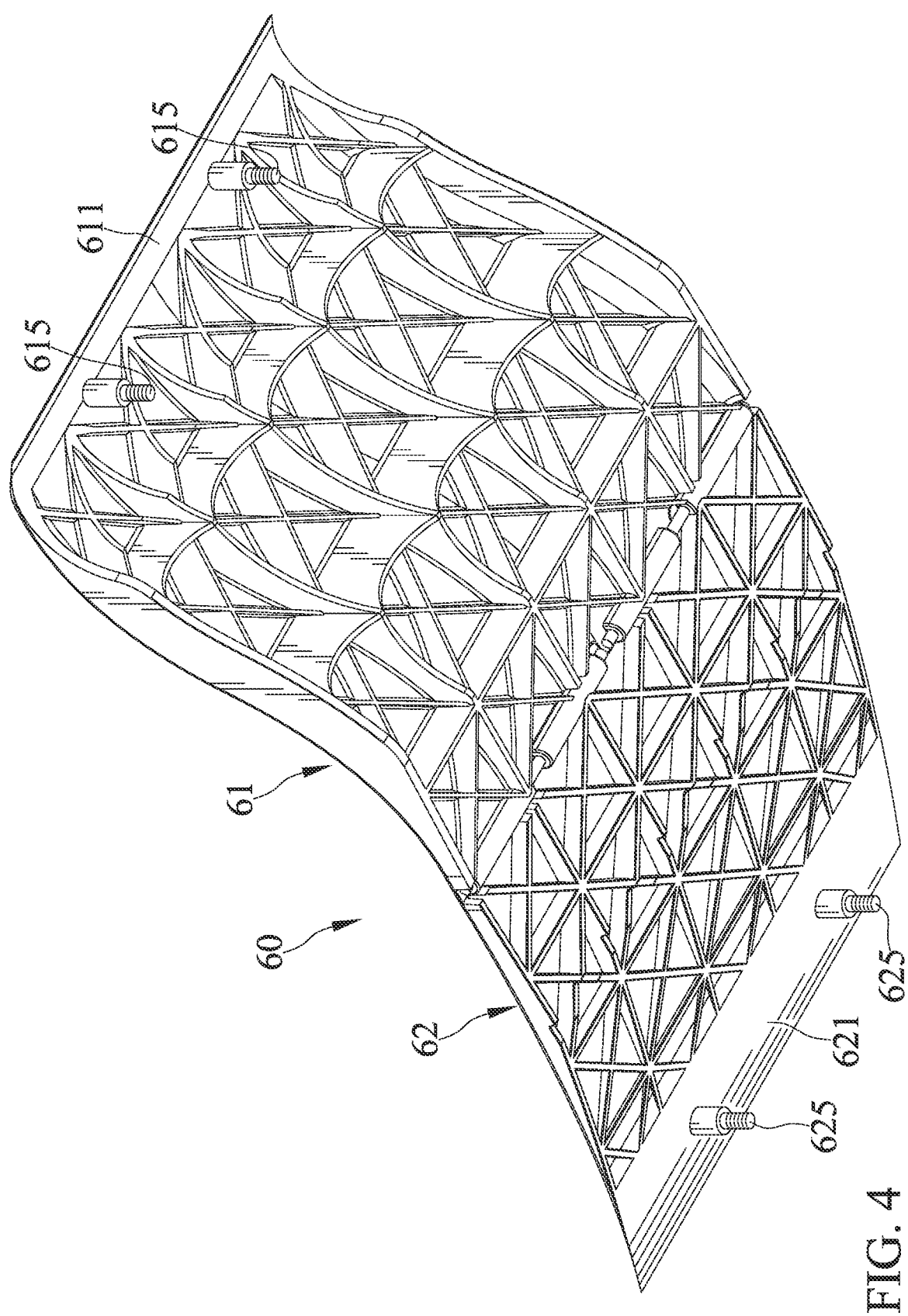
FIG. 4 is a perspective view of a second connection assembly of the combination ramp system of FIG. 1.
Figure 5:
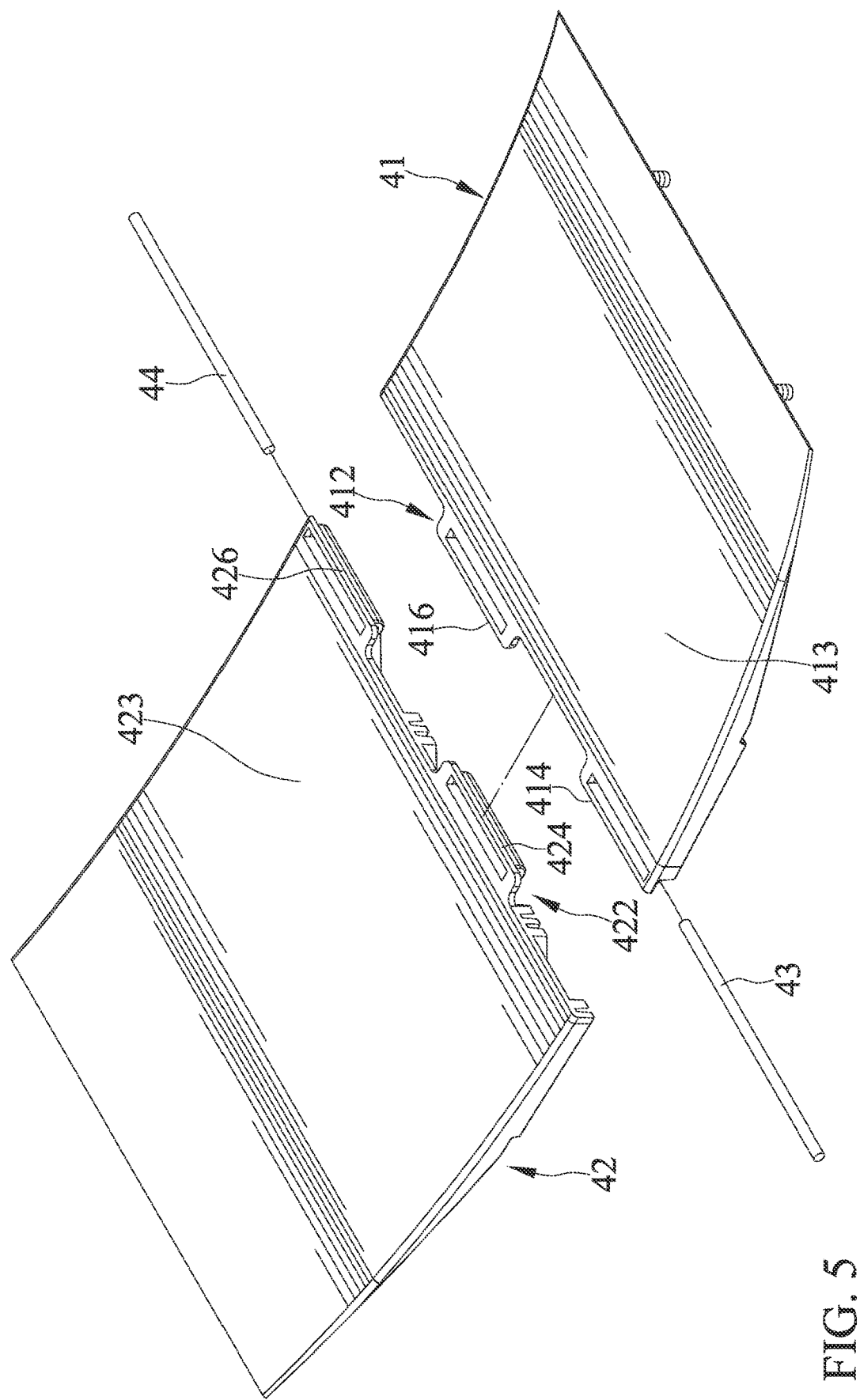
FIG. 5 is an exploded, perspective view of the first connection assembly of FIG. 3.
Figure 6:
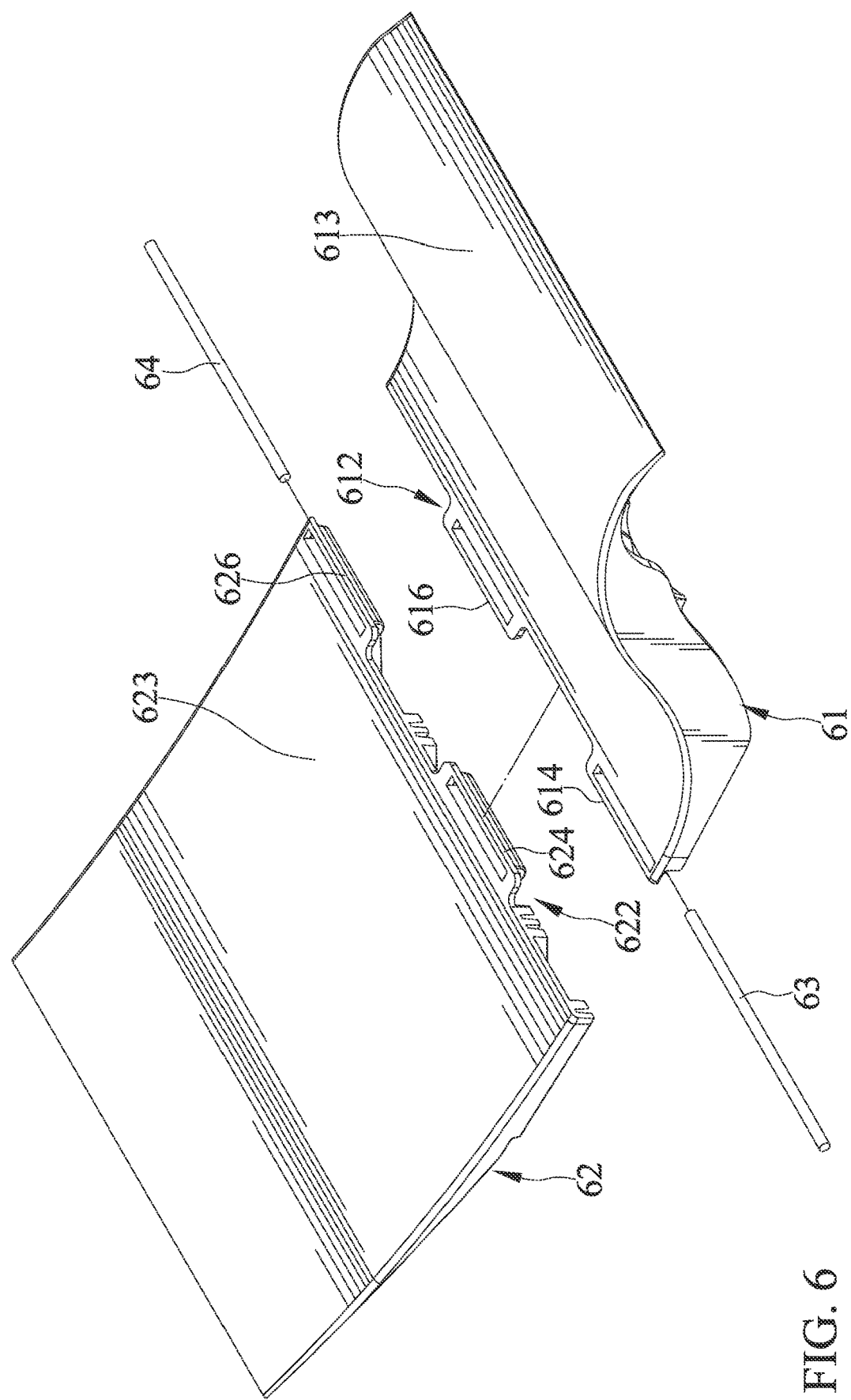
FIG. 6 is an exploded, perspective view of the second connection assembly of FIG. 4.
Figure 7:
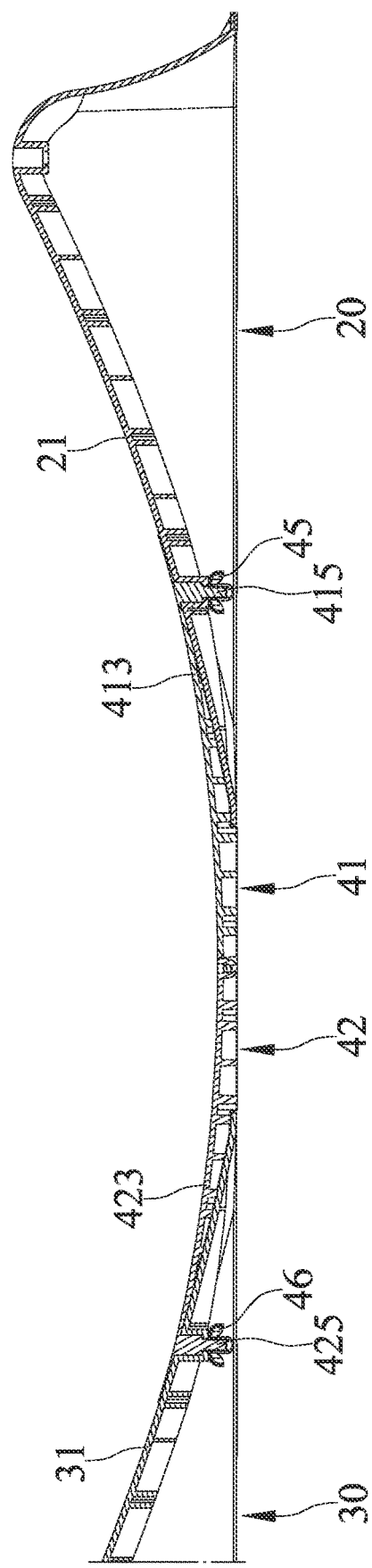
FIG. 7 is a cross sectional view of the first connection assembly of FIG. 3.
Figure 8:
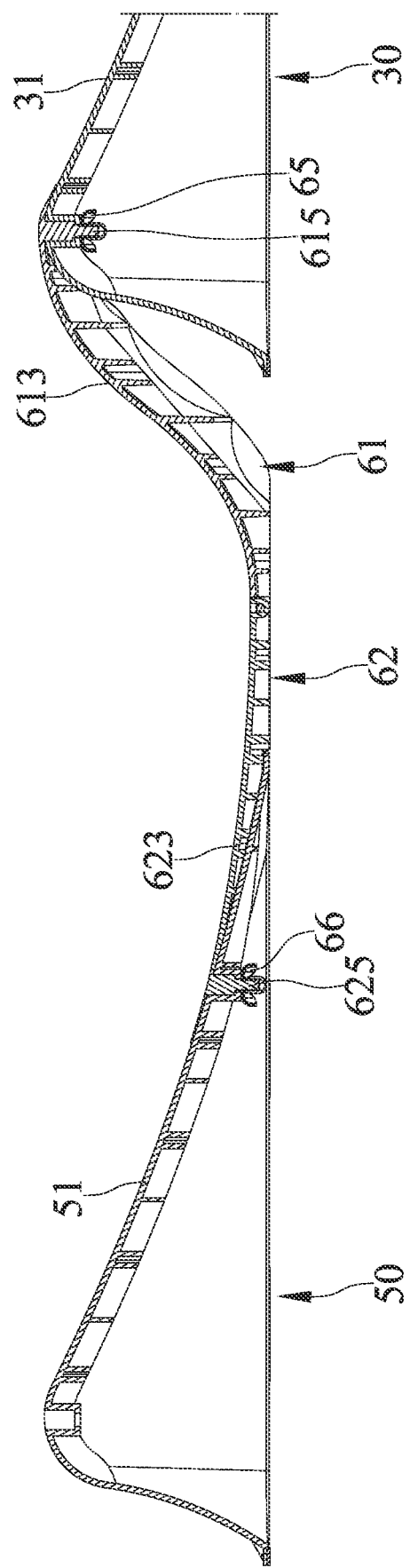
FIG. 8 is a cross sectional view of the second connection assembly of FIG. 3.

FIGS. 1-8 show a combination ramp system 10 for sports of an embodiment according to the present invention including a first ramp 20, a second ramp 30, and a first connecting assembly 40.

The first ramp 20 has a first inclined surface 21 disposed on an upper edge thereof in a vertical direction.

The second ramp 30 has a second inclined surface 31 disposed on an upper edge thereof in the vertical direction. A height of the first inclined surface 21 in the vertical direction gradually increases from a position adjacent to the second ramp 30 to a position away from the second ramp 30, and a height of the second inclined surface 31 in the vertical direction gradually increases from a position adjacent to the first ramp 20 to a position away from the first ramp 20.

The first connection assembly 40 is mounted between the first ramp and the second ramp 30 and includes a first connecting member 41 and a second connecting member 42. One end of the first connecting member 41 is provided with a first connecting portion 411 connected to the first inclined surface 21, and another end of the first connecting member 41 is provided with a first butting portion 412. One end of the second connecting member 42 is provided with a second connecting portion 421 connected to the second inclined surface 31, and another end of the second connecting member 42 is provided with a second butting portion 422 connected to the first butting portion 412. An upper edge of the first connecting member 41 in the vertical direction has a first top surface 413 adjacent to the first inclined surface 21. An upper edge of the second connecting member 42 in the vertical direction has a second top surface 423 adjacent to the second inclined surface 31.

The first butting portion 412 is provided with a first butting flange 414. The second butting portion 422 is provided with a second butting flange 424 adjacent to the first butting flange 414. The first connection assembly 40 further includes a first pin 43 extended in a horizontal direction and inserting through the first butting flange 414 and the second butting flange 424.

The first inclined surface 21 is provided with a plurality of first insertion holes 211. The first connecting portion 411 is disposed at a lower edge of the first connecting member 41 in the vertical direction and forms a plurality of first fastening flanges 415 inserting into the plurality of first insertion holes 211. The second inclined surface 31 is provided with a plurality of second insertion holes 311. The second connecting portion 421 is disposed at a lower edge of the second connecting member 42 in the vertical direction and forms a plurality of second fastening flanges 425 inserting into the plurality of second insertion holes 311.

The first butting portion 412 is further provided with a third butting flange 416 disposed adjacent to one side of the second butting flange 424 opposite to the first butting flange 414. The second butting portion 422 is further provided with a fourth butting flange 426 disposed adjacent to one side of the third butting flange 416 opposite to the second butting flange 424. The first connection assembly 40 further includes a second pin 44 extended in the horizontal direction and inserting through the third butting flange 416 and the fourth butting flange 426.

The first connection assembly 40 further includes a plurality of first fasteners 45 and a plurality of second fasteners 46. The plurality of first fasteners 45 are threadedly connected to the plurality of first fastening flanges 415 and abut against a lower edge of the first ramp 20 in the vertical direction. The plurality of second fasteners 46 are threadedly connected to the plurality of second fastening flanges 425 and abut against a lower edge of the second ramp 30 in the vertical direction.

The upper edge of the second ramp 30 in the vertical direction is provided with an overlap joint portion 32 disposed at one end of the second inclined surface 31 opposite to the first ramp 20. The combination ramp system 10 further includes a third ramp 50 and a second connection assembly 60. The third ramp 50 is disposed at one side of the second ramp opposite to the first ramp 20. The third ramp 50 has a third inclined surface 51 disposed on an upper edge thereof in the vertical direction. A height of the third inclined surface 51 in the vertical direction gradually increases from a position adjacent to the second ramp 30 to a position away from the second ramp 30. The second connection assembly 60 mounted between the second ramp 30 and the third ramp 50 and including a third connecting member 61 and the fourth connecting member 62. One end of the third connecting member 61 is provided with a third connecting portion 611 connected to the overlap joint portion 32, and another end of the third connecting member 61 is provided with a third butting portion 612. One end of the fourth connecting member 62 is provided with a fourth connecting portion 621 connected to the third inclined surface 51, and another end of the fourth connecting member 62 is provided with a fourth butting portion 622 connected to third butting portion 612. An upper edge of the third connecting member 61 in the vertical direction has a third top surface 613 adjacent to the second inclined surface 31. An upper edge of the fourth connecting member 62 in the vertical direction has a fourth top surface 623 adjacent to the third inclined surface 51.

The third butting portion 612 is provided with a fifth butting flange 614. The fourth butting portion 622 is provided with a sixth butting flange 624 adjacent to the fifth butting flange 614. The second connection assembly 60 further includes a third pin 63 extended in the horizontal direction and inserting through the fifth butting flange 614 and the sixth butting flange 624.

The overlap joint portion 32 is provided with a plurality of third insertion holes 321. The third connecting portion 611 is disposed at a lower edge of the third connecting member 61 in the vertical direction and forms a plurality of third fastening flanges 615 inserting into the plurality of third insertion holes 321. The third inclined surface 51 is provided with a plurality of fourth insertion holes 511. The fourth connecting portion 621 is disposed at a lower edge of the fourth connecting member 62 in the vertical direction and forms a plurality of fourth fastening flanges 625 inserting into the plurality of fourth insertion holes 511.

The third butting portion 612 is further provided with a seventh butting flange 616 disposed adjacent to one side of the sixth butting flange 624 opposite to the fifth butting flange 614. The fourth butting portion 622 is further provided with a eighth butting flange 626 disposed adjacent to one side of the seventh butting flange 616 opposite to the sixth butting flange 624. The second connection assembly 60 further includes a fourth pin 64 extended in the horizontal direction and inserting through the seventh butting flange 616 and the eighth butting flange 626.

The second connection assembly 60 further includes a plurality of third fasteners 65 and a plurality of fourth fasteners 66. The plurality of third fasteners 65 are threadedly connected to the plurality of third fastening flanges 615 and abut against the lower edge of the second ramp 30 in the vertical direction. The plurality of fourth fasteners 66 are threadedly connected to the plurality of fourth fastening flanges 625 and abut against the lower edge of the third ramp 50 in the vertical direction.

Thus, the combination ramp system 10 can provide multiple terrain types, and the combination ramp system 10 is no limited to only connecting between ramp peaks.

Although specific embodiments have been illustrated and described, numerous modifications and variations are still possible without departing from the scope of the invention. The scope of the invention is limited by the accompanying claims.

The invention claimed is:

1. A combination ramp system comprising:
a first ramp having a first inclined surface disposed on an upper edge thereof in a vertical direction;
a second ramp having a second inclined surface disposed on an upper edge thereof in the vertical direction;
wherein a height of the first inclined surface in the vertical direction gradually increases from a position adjacent to the second ramp to a position away from the second ramp, wherein a height of the second inclined surface in the vertical direction gradually increases from a position adjacent to the first ramp to a position away from the first ramp;
a first connection assembly mounted between the first ramp and the second ramp and including a first connecting member and a second connecting member, wherein one end of the first connecting member is provided with a first connecting portion connected to the first inclined surface, and another end of the first connecting member is provided with a first butting portion, wherein one end of the second connecting member is provided with a second connecting portion connected to the second inclined surface, and another end of the second connecting member is provided with a second butting portion connected to the first butting portion, wherein an upper edge of the first connecting member in the vertical direction has a first top surface adjacent to the first inclined surface, and wherein an upper edge of the second connecting member in the vertical direction has a second top surface adjacent to the second inclined surface.

2. The combination ramp system as claimed in claim 1, wherein the first butting portion is provided with a first butting flange, wherein the second butting portion is provided with a second butting flange adjacent to the first butting flange, and wherein the first connection assembly further includes a first pin extended in a horizontal direction and inserting through the first butting flange and the second butting flange.

3. The combination ramp system as claimed in claim 2, wherein the first inclined surface is provided with a plurality of first insertion holes, wherein the first connecting portion is disposed at a lower edge of the first connecting member in the vertical direction and forms a plurality of first fastening flanges inserting into the plurality of first insertion holes, wherein the second inclined surface is provided with a plurality of second insertion holes, and wherein the second connecting portion is disposed at a lower edge of the second connecting member in the vertical direction and forms a plurality of second fastening flanges inserting into the plurality of second insertion holes.

4. The combination ramp system as claimed in claim 3, wherein the first butting portion is further provided with a third butting flange disposed adjacent to one side of the second butting flange opposite to the first butting flange, wherein the second butting portion is further provided with a fourth butting flange disposed adjacent to one side of the third butting flange opposite to the second butting flange, wherein the first connection assembly further includes a second pin extended in the horizontal direction and inserting through the third butting flange and the fourth butting flange.

5. The combination ramp system as claimed in claim 4, wherein the first connection assembly further includes a plurality of first fasteners and a plurality of second fasteners, wherein the plurality of first fasteners are threadedly connected to the plurality of first fastening flanges and abut against a lower edge of the first ramp in the vertical direction, and wherein the plurality of second fasteners are threadedly connected to the plurality of second fastening flanges and abut against a lower edge of the second ramp in the vertical direction.

6. The combination ramp system as claimed in claim 5, wherein the upper edge of the second ramp in the vertical direction is provided with an overlap joint portion disposed at one end of the second inclined surface opposite to the first ramp;

wherein the combination ramp system further comprises:
a third ramp and a second connection assembly, wherein the third ramp is disposed at one side of the second ramp opposite to the first ramp, wherein the third ramp has a third inclined surface disposed on an upper edge thereof in the vertical direction, wherein a height of the third inclined surface in the vertical direction gradually increases from a position adjacent to the second ramp to a position away from the second ramp, wherein the second connection assembly mounted between the second ramp and the third ramp and including a third connecting member and the fourth connecting member, wherein one end of the third connecting member is provided with a third connecting portion connected to the overlap joint portion, and another end of the third connecting member is provided with a third butting portion, wherein one end of the fourth connecting member is provided with a fourth connecting portion connected to the third inclined surface, and another end of the fourth connecting member is provided with a fourth butting portion connected to third butting portion, wherein an upper edge of the third connecting member in the vertical direction has a third top surface adjacent to the second inclined surface, and wherein an upper edge of the fourth connecting member in the vertical direction has a fourth top surface adjacent to the third inclined surface.

7. The combination ramp system as claimed in claim 6, wherein the third butting portion is provided with a fifth butting flange, wherein the fourth butting portion is provided with a sixth butting flange adjacent to the fifth butting flange, and wherein the second connection assembly further includes a third pin extended in the horizontal direction and inserting through the fifth butting flange and the sixth butting flange.

8. The combination ramp system as claimed in claim 7, wherein the overlap joint portion is provided with a plurality of third insertion holes, wherein the third connecting portion is disposed at a lower edge of the third connecting member in the vertical direction and forms a plurality of third fastening flanges inserting into the plurality of third insertion holes, wherein the third inclined surface is provided with a plurality of fourth insertion holes, wherein the fourth connecting portion is disposed at a lower edge of the fourth connecting member in the vertical direction and forms a plurality of fourth fastening flanges inserting into the plurality of fourth insertion holes.

9. The combination ramp system as claimed in claim 8, wherein the third butting portion is further provided with a seventh butting flange disposed adjacent to one side of the sixth butting flange opposite to the fifth butting flange, wherein the fourth butting portion is further provided with a eighth butting flange disposed adjacent to one side of the seventh butting flange opposite to the sixth butting flange, and wherein the second connection assembly further includes a fourth pin extended in the horizontal direction and inserting through the seventh butting flange and the eighth butting flange.

10. The combination ramp system as claimed in claim 9, wherein the second connection assembly further includes a plurality of third fasteners and a plurality of fourth fasteners, wherein the plurality of third fasteners are threadedly connected to the plurality of third fastening flanges and abut against the lower edge of the second ramp in the vertical direction, and wherein the plurality of fourth fasteners are threadedly connected to the plurality of fourth fastening flanges and abut against the lower edge of the third ramp in the vertical direction.

\* \* \* \* \*